United States Patent
Jiang et al.

(10) Patent No.: US 12,429,949 B2
(45) Date of Patent: Sep. 30, 2025

(54) ORIGAMI-BASED CONTACT MEMBERS, DEVICES AND SYSTEMS USED FOR ACTIVE MECHANICAL HAPTICS

(71) Applicant: WESTLAKE UNIVERSITY, Hangzhou (CN)

(72) Inventors: Hanqing Jiang, Hangzhou (CN); Zhuang Zhang, Hangzhou (CN); Luoqian Emu, Hangzhou (CN); Zhenghao Xu, Hangzhou (CN)

(73) Assignee: WESTLAKE UNIVERSITY, Hangzhou (CN)

( * ) Notice: Subject to any disclaimer, the term of this patent is extended or adjusted under 35 U.S.C. 154(b) by 0 days.

(21) Appl. No.: 18/284,842

(22) PCT Filed: Dec. 22, 2022

(86) PCT No.: PCT/CN2022/141104
§ 371 (c)(1),
(2) Date: Sep. 28, 2023

(87) PCT Pub. No.: WO2023/142807
PCT Pub. Date: Aug. 3, 2023

(65) Prior Publication Data
US 2024/0211047 A1 Jun. 27, 2024

(51) Int. Cl.
*G06F 3/01* (2006.01)
(52) U.S. Cl.
CPC .............. *G06F 3/016* (2013.01); *G06F 3/011* (2013.01)
(58) Field of Classification Search
None
See application file for complete search history.

(56) References Cited

U.S. PATENT DOCUMENTS 10,538,028 B2 * 1/2020 Rogers ................. B32B 27/283
2018/0348025 A1 * 12/2018 Jahromi ................ G01D 21/00
2022/0097240 A1 * 3/2022 Jiang ..................... B63B 35/00

FOREIGN PATENT DOCUMENTS

| CN | 108852582 A | 11/2018 |
| CN | 109129456 A | 1/2019 |
| CN | 112208677 A | 1/2021 |

OTHER PUBLICATIONS

International Search Report and Written Opinion, International Application No. PCT/CN2022/141104, mailed on Apr. 20, 2023.

* cited by examiner

*Primary Examiner* — Krishna P Neupane
(74) *Attorney, Agent, or Firm* — MARSHALL, GERSTEIN & BORUN LLP

(57) ABSTRACT

Origami-based contact members, devices and systems used for active mechanical haptics. The origami-based contact member includes a top plate, a bottom plate, and at least one piece of a curved origami-based metamaterial interposed therebetween, with its top end fixed to the top plate and its bottom end fixed to the bottom plate, the top plate is exposed to be contacted by a user's body site. The metamaterial includes a panel having a single curved crease extending in its longitudinal direction, which divides the panel into two facets. The panel is foldable along the single curved crease to form a folding angle between the two facets. The folding angle is adjustable by rotating the bottom plate to achieve a variable stiffness when loaded in a vertical axis between the top and bottom plates, covering positive stiffness to negative stiffness, to be perceived by the user's body site via contact with the top plate.

30 Claims, 11 Drawing Sheets

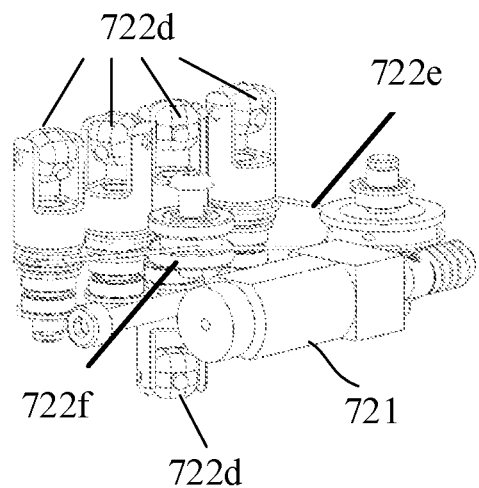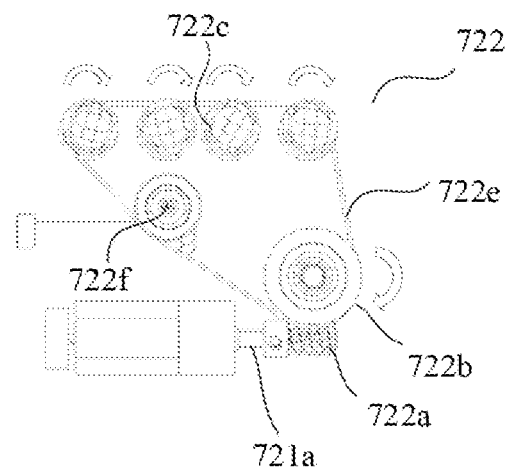
FIG. 9(a)　　　　　　　　　FIG. 9(b)
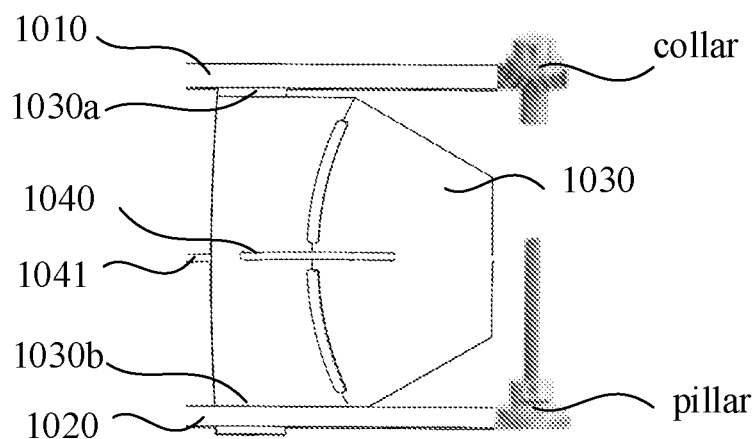
FIG. 10(a)

ORIGAMI-BASED CONTACT MEMBERS, DEVICES AND SYSTEMS USED FOR ACTIVE MECHANICAL HAPTICS

TECHNICAL FIELD

The present disclosure relates to origami-based contact members, devices and systems used for active mechanical haptics.

BACKGROUND

The emerging metaverse powered by virtual reality (VR) and augmented reality (AR) technologies is transforming present digital media viewed in the third person to a future immersive platform that vividly represents the physical environment perceived in the first person. This is achieved by constructing a virtual environment with authentic sensory perceptions, including but not limited to sight, hearing, and touch. In this new paradigm of how humans engage with future media, VR/AR technologies are primed to permeate a range of industry sectors (e.g., entertainment, communications, education, human-machine interaction, teleoperation, clinical therapy, and rehabilitation), while aided by advanced software (i.e., communication technologies, various apps and social networks) and hardware (i.e., VR/AR and haptic devices) to enhance our VR/AR, haptic experiences. Although state-of-the-art VR/AR devices offer stereoscopic visual and audial sensory perceptions, they fail in delivering a concrete sensory dimension in the mechanical domain, namely, touch sensation. In fact, the touching sensation is remarkably very different from our visual and auditory perceptions, which are passive because we as humans receive the information as third persons. Substantial progress has been made to make the virtual world touchable by bringing passive haptic experiences to users; however, most produce simple and hand-centered motion constraints or vibrations (vibro-haptics). This is in stark contrast to the physical environment in which humans feel natural objects in terms of their hardness, softness, and even the broken moments of fragile ones through active touch via hands, feet, or other body parts. On the other hand, the touching sensation is primarily active, and human-triggered mechanical sensory perception is considered one of the most indispensable human senses for interacting with the physical universe, therefore, the controlled active mechanical haptic that allowing users to actively generate and sense mechanical touching sensations are expected to be reproduced in the virtual world.

SUMMARY

The present disclosure is provided to solve the above issues existing in the prior art, namely, to provide origami-based contact members and haptic devices used for active mechanical haptics, immersive VR/AR system for providing active mechanical haptics, and corresponding sensory perceptions, allowing users to actively generate and sense mechanical touching sensations with controllable stiffness, ranging from hard to soft and from positive to negative. The origami-based contact members, haptic devices and immersive VR/AR system aim to produce human-triggered mechanical sensory perception and enhance the VR/AR experiences beyond visual, auditory or passive haptic sensations while delivering a range of diverse and immersive experiences.

In accordance with an aspect of the present disclosure, an origami-based contact member used for active mechanical haptics includes a top plate, a bottom plate, and at least one piece of a curved origami-based metamaterial interposed therebetween, with its top end fixed to the top plate and its bottom end fixed to the bottom plate, the top plate is exposed to be contacted by a user's body site, wherein, the curved origami-based metamaterial comprises a panel having a single curved crease extending in its longitudinal direction, which divides the panel into two facets at its two opposite sides, the panel is configured to be folded along the single curved crease to form a folding angle between the two facets, the folding angle is configured to be adjusted by rotating the bottom plate to achieve a variable stiffness when loaded in a vertical axis between the top and bottom plates, covering positive stiffness to negative stiffness, to be perceived by the user's body site via contact with the top plate.

In another aspect of the present disclosure, a haptic in-hand device for providing active mechanical haptics is provided and includes five origami-based contact members of any one of the embodiments of the present disclosure, the user's body site is finger or thumb; an actuation mechanism and a control portion, wherein the control portion is configured to: communicate with a VR/AR engine, so as to receive a stiffness tuning command indicating the current stiffness of a virtual object upon track the user's active grasping operation on the virtual object in a VR/AR scene; control the actuation mechanism in response to the stiffness tuning command, so as to rotate the shafts of the bottom plates to tune the stiffness to be perceived by the user's finger/thumb; and a support shell for housing the five origami-based contact members, the actuation mechanism, and the control portion, the support shell is provided with five openings for exposing the top plates to the outside.

In another aspect of the present disclosure, an origami-based contact member used for active mechanical haptics is provided and includes a top plate exposed to be contacted by a user's body site, a bottom plate, and a plurality of pieces of curved origami-based metamaterial interposed therebetween and arranged in rows, and cables provided corresponding to the rows, so that each row has an independent cable, each piece of the curved origami-based metamaterial has a top end and a bottom end, the top end is fixed to the top plate and the bottom end is fixed to the bottom plate, each piece of the curved origami-based metamaterial comprises a panel having a single curved crease extending in its longitudinal direction, which divides the panel into two facets at its two opposite sides, the panel is configured to be folded along the single curved crease to form a folding angle between the two facets, a first hole is cut in one of the two facets and a second hole is cut in the other of the two facets, for each row of the pieces of curved origami-based metamaterial, the corresponding independent cable passes through the two holes cut in panels consequently in series, with its side behind each panel knotted, so as to be pulled/released synchronously to adjust the folding angles of the panels to achieve a variable stiffness when loaded in a vertical axis between the top and bottom plates, covering positive stiffness to negative stiffness, to be perceived by the user's body site via contact with the top plate.

In another aspect of the present disclosure, a haptic stepping device for providing active mechanical haptics is provided and includes the origami-based contact members of any one of the embodiments of the present disclosure, the user's body site is foot; an actuation mechanism including the cables and a control portion, wherein the control portion is configured to: communicate with a VR/AR engine, so as to receive a stiffness tuning command indicating the current stiffness of a virtual object upon track the user's active stepping operation on the virtual object in a VR/AR scene; controlling the actuation mechanism in response to the stiffness tuning command, so as to pull/release the cables synchronously to tune the stiffness to be perceived by the user's foot.

In another aspect of the present disclosure, an immersive VR/AR system for providing active mechanical haptics is provided and includes the haptic in-hand device for providing active mechanical haptics of any one of the embodiments of the present disclosure and/or the haptic stepping device for providing active mechanical haptics of any one of the embodiments of the present disclosure as the haptic assembly; the VR/AR engine, which is configured to: communicate with both the VR/AR device and the haptic device; transmit a stiffness tuning command indicating the current stiffness of a virtual object upon track the user's active grasping and/or active stepping operation on the virtual object in a VR/AR scene to the haptic assembly; and transmitting stream related to the VR/AR scene to the VR/AR device. The immersive VR/AR system also includes the VR/AR device, which is configured to communicate with the VR/AR engine to receive stream related to the VR/AR scene and presenting VR/AR scene to the user accordingly, and to track the user's active grasping and/or active stepping operation on the virtual object in the VR/AR scene.

In another aspect of the present disclosure, an origami-based contact member used for active mechanical haptics is provided and includes a top plate, a bottom plate, and at least one piece of a curved origami-based metamaterial interposed therebetween, wherein, the curved origami-based metamaterial comprises a panel, and a variable stiffness of the curved origami-based metamaterial is achieved by twisting the panel, or, pulling/releasing the panel by a connecting member passing through the panel; wherein the variable stiffness covering positive stiffness to negative stiffness.

Further details and aspects of exemplary embodiments of the present disclosure are described in more detail below with reference to the appended figures.

The origami-based contact members and the haptic devices used for active mechanical haptics according to the present disclosure may achieve an active mechanical haptics that cover positive stiffness (feeling hardness and softness) and negative stiffness (feeling broken and falling moments), which are considered central to and part of the first sensory perceptions in a human's daily interactions with the physical environment for exploring/processing information and creating an ontological metaphor. Moreover, the immersive VR/AR system for providing active mechanical haptics according to the present disclosure may obtain a combination of visual, audial, and active touching sensory perceptions in AR/VR haptic experiences so that to offer exciting potential for extending the realism of the virtual world.

The foregoing general description and the following detailed description are only exemplary and illustrative, and do not intend to limit the present disclosure.

BRIEF DESCRIPTION OF THE DRAWINGS

In the drawings, which are not necessarily drawn to scale, like reference numerals may describe similar components in different views. Like reference numerals having letter suffixes or different letter suffixes may represent different instances of similar components. The drawings illustrate generally, by way of example, but not by way of limitation, various embodiments, and together with the description and claims, serve to explain the disclosed embodiments. Such embodiments are demonstrative and not intended to be exhaustive or exclusive embodiments of the present method, device, system, or non-transitory computer readable medium having instructions thereon for implementing the method.

FIG. 9(a) illustrates an exploded-view schematic diagram of the actuation mechanism of the haptic in-hand device according to embodiments of the present disclosure.

FIG. 9(b) illustrates a top view schematic diagram of the transmission system of the actuation mechanism according to embodiments of the present disclosure.

FIG. 10(a) illustrates a schematic diagram of composition of another origami-based contact member used for active mechanical haptics according to embodiments of the present disclosure.

DETAILED DESCRIPTION OF THE DRAWINGS

In order to enable those skilled in the art to better understand the technical solutions of the present disclosure, the present disclosure will be described in detail below in conjunction with the accompanying drawings and specific embodiments. The embodiments of the present disclosure will be described in further detail below in conjunction with the accompanying drawings and specific embodiments, but they are not intended to limit the present disclosure.

"First", "second" and similar words used in the present disclosure do not indicate any order, quantity or importance, but are only used to distinguish different components. "Include" or "comprise" and other similar words mean that an element appearing before this word covers an element listed after this word, but do not exclude other elements.

In addition, although exemplary embodiments have been described herein, the scope thereof includes any and all embodiments based on the present disclosure having equivalent elements, modifications, omissions, combinations (e.g., scenarios where various embodiments intersect), adaptations, or changes. The elements of the claims will be construed broadly based on the language employed in the claims and are not limited to the examples described in this specification or during implementation of this application, the examples of which will be construed as non-exclusive. Accordingly, this specification and the examples are intended to be considered as examples only and the true scope and spirit are indicated by the full scope of the following claims and their equivalents.

Figure 1A:
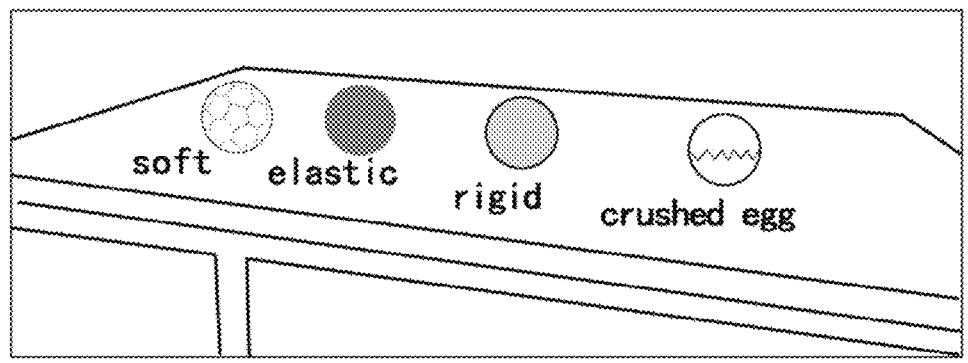
FIG. 1(a) and FIG. 1(b) illustrate several exemplary active stiffness perceptions and in life scenarios according to embodiments of the present disclosure.
Figure 1B:
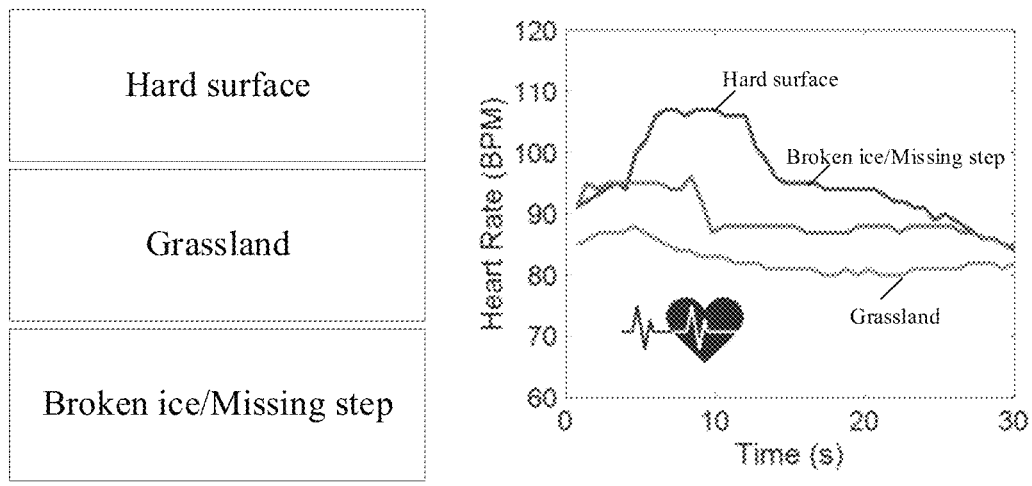

FIG. 1(a) and FIG. 1(b) illustrate several exemplary active stiffness perceptions in life scenarios according to embodiments of the present disclosure. In FIG. 1(a), examples of human-initiated in-hand stiffness perceptions, including feeling positive stiffness when grasping elastic/rigid/soft objects, while negative stiffness when crushing readily broken objects, such as eggs are shown. And in FIG. 1 (b), examples of human-initiated body-centered stiffness perceptions, including feeling positive stiffness during stepping on varied grounds, while negative stiffness when accidentally missing a step are schematically illustrated.

In scenarios presented in FIG. 1(a) and FIG. 1(b), humans can easily distinguish objects when grasped in hands or stepped under foot due to a distinct intrinsic property of the object, namely, its stiffness. When hitting balls or stepping on grounds with different hardness, human bodies feel positive stiffness, and the difference is reflected in the magnitude of the positive stiffness value. However, when crushing an egg or missing one's step in walking, we experience a negative stiffness, leading to a feeling of falling or even fear (users' psychological response are shown in the heart rate profile in FIG. 1(b)). To reconstruct these active touch feelings in the VR/AR environment, the origami-based contact members, haptic devices and immersive VR/AR system for active mechanical haptics are proposed in the present disclosure.

Figure 2A:
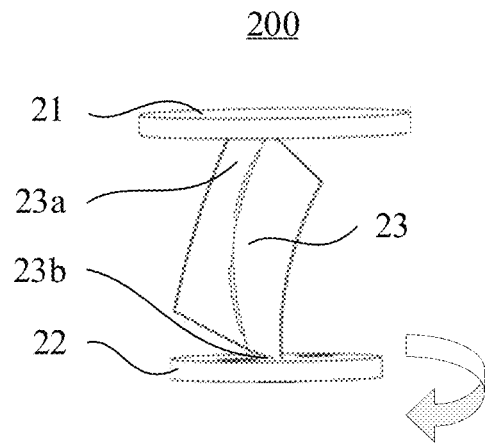
FIG. 2(a) illustrates a schematic diagram of partial composition of an origami-based contact member used for active mechanical haptics according to embodiments of the present disclosure.

FIG. 2(a) illustrates a schematic diagram of partial composition of an origami-based contact member used for active mechanical haptics according to embodiments of the present disclosure.

As shown in FIG. 2(a), the origami-based contact member used for active mechanical haptics include a top plate 21, a bottom plate 22, and at least one piece of a curved origami-based metamaterial 23 interposed therebetween, with its top end 23a fixed to the top plate 21 and its bottom end 203b fixed to the bottom plate 22, the top plate 21 is exposed to be contacted by a user's body site (not shown in FIG. 2(a)).

FIG. 3(a)-FIG. 3(h) illustrate the schematic diagram of partial composition of the curved origami-based metamaterial 23 and its working mechanism for stiffness tuning. In these figures, where a, the angle between the horizontal edge and the tangent line at the end of the single curved crease 232, denotes the normalized curvature of the single curved crease 232; β, the angle between two bending facets (facet 1 and facet2), representing the plastic origami folding.

Figure 3A:
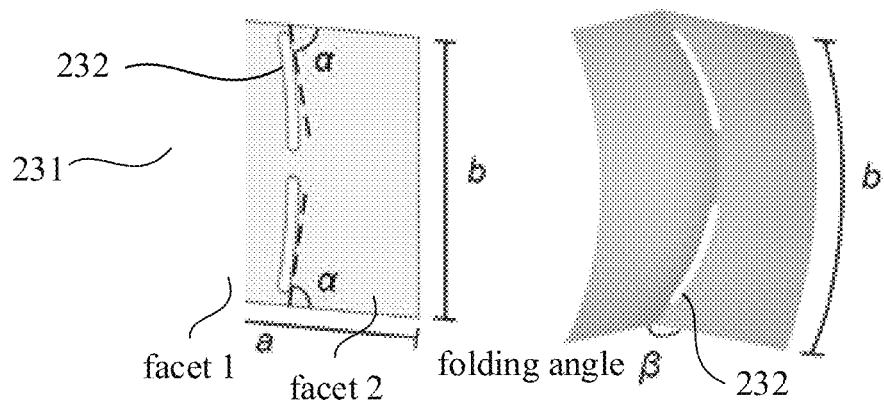
FIG. 3(a)-FIG. 3(h) illustrate a schematic diagram of partial composition and working mechanism for stiffness tuning of the curved origami-based metamaterial according to embodiments of the present disclosure.
Figure 3B:
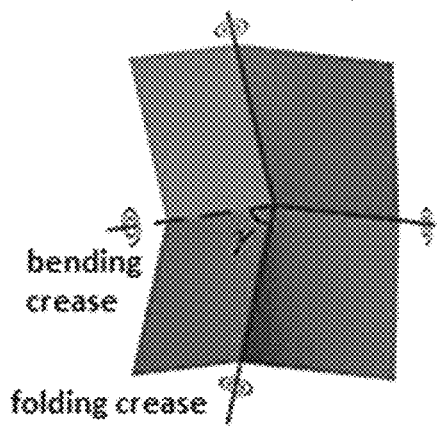

FIG. 3(a) shows 2D pattern (unfolded and flattened) and 3D configuration (already folded) of the curved origami-based metamaterial 23. As shown in FIG. 3(a), the curved origami-based metamaterial 23 comprises a panel 231 having a single curved crease 232 extending in its longitudinal direction, which divides the panel 231 into two facets at its two opposite sides, which are illustrated as facet 1 and facet 2. Furthermore, the panel 231 is configured to be folded along the single curved crease 232 to form a folding angle β between facet 1 and facet 2, and the folding angle β is configured to be adjusted by rotating the bottom plate 22 to achieve a variable stiffness when loaded in a vertical axis between the top plate 21 and bottom plate 22, covering positive stiffness to negative stiffness, to be perceived by the user's body site via contact with the top plate 21 (see FIG. 2(a)).

Figure 3C:
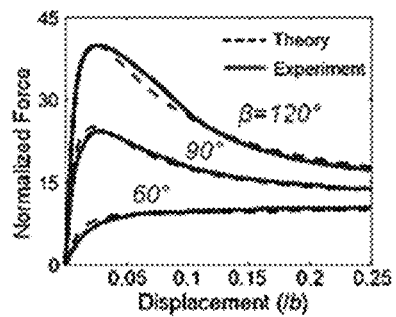
Figure 3D:
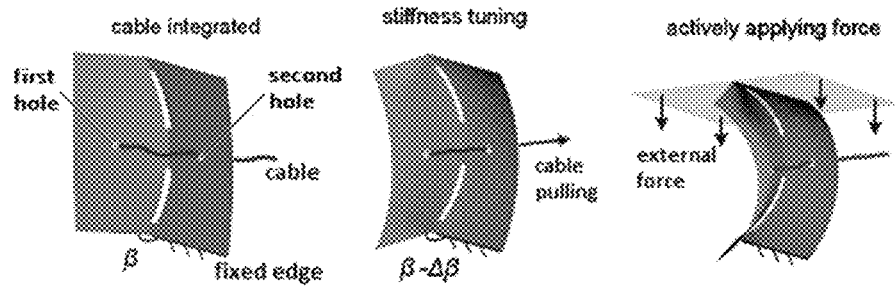
Figure 3E:
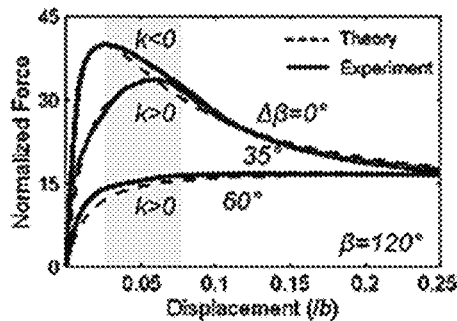

With reference to FIG. 3(a), by simply introducing the single curved crease 232, which is a circular arc-shaped cutting line characterized by an angle β that is related to the radius of the circle ρ by $$\cos\alpha = \frac{b}{2\rho},$$

where a×b is the geometry of the rectangular panel 231, a curved origami-based metamaterial 23 is formed by folding the 2D panel 231 along the single curved crease 232 (FIG. 3(a)). The folding angle β about the single curved crease 232 is determined by the plasticity imposed by the folding process, with smaller β for larger bending deformation on the curved origami-based metamaterial 23 and larger β for smaller bending deformation. For the single curved crease 232, panel 231, and plasticity at the single curved crease 232, a variant (nonstandard) Miura origami (FIG. 3(b)) was used to analytically simulate and detail the mechanical behavior of the curved origami, where angle γ is related to the plastic folding angle β, i.e., γ(β), which is then adopted to predict the stiffness of the curved origami and guide the design choices. Upon application of a vertical load on top plate 21 (see FIG. 2(a)), the curved origami-based metamaterial 23 exerts different force-displacement relationships depending on the competition between the bending deformation proving positive stiffness, and the folding deformation about the single curved crease 232 providing negative stiffness. FIG. 3(c) presents the force-displacement relation of one curved origami-based metamaterial 23 defined by α=80° and a/b=1.25 under different folding angle β (i.e., initial states) for 60°, 90°, and 120°, with larger β (e.g., 120°) exhibiting both positive and negative ranges, while smaller β (e.g., 60°) leading to only positive stiffness. Thus, for a given curved origami-based metamaterial 23 (i.e., angle α), one can readily tune its stiffness by changing the folding angle β, such as by rotating the bottom plate 22, or through cable-driven method (FIG. 3(d)), where an external force is actively applied on top plate 21 (e.g., by a user of active mechanical haptics), and a cable is introduced through the two facet (facet 1 and facet 2) to adjust folding angle from a specific initial value (e.g. β=120° for a broader tuning range) by Δβ in real time. Different from the plasticity during the folding process that defines folding angle β, the twisting of the bottom plate 22 or the cable pulling results in an elastic folding process of the curved origami-based metamaterial 23 where it instantly recovers to its original folding state (defined by folding angle β) after the bottom plate 22 is twisted back or the cable is released. FIG. 3(e) shows the force-displacement relationships for a curved origami-based metamaterial 23, with α=80°, β=120°, and a/b=1.25, under different tuning angle Δβ (Δβ=0°, 35°, and 60°), exhibiting variable stiffness spanning positive and negative ranges when loaded in a vertical axis between the top plate 21 and bottom plate 22, and the variable stiffness can be perceived by the user's body site via contact with the top plate 21.

Figure 3F:
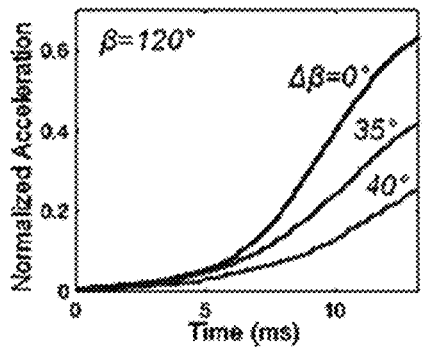
Figure 3G:
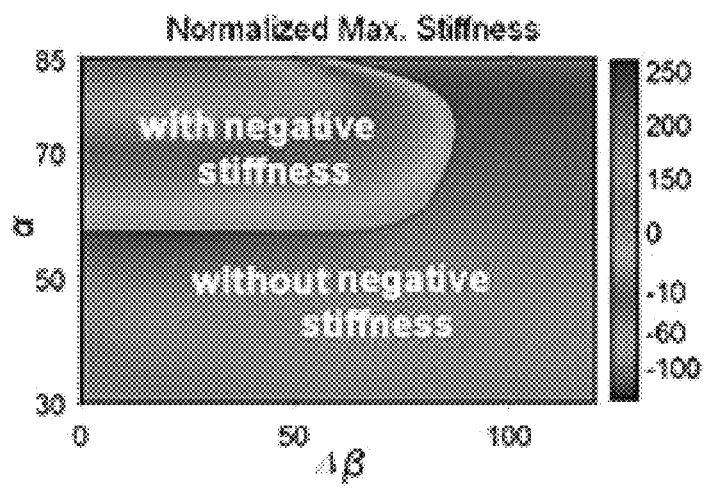
Figure 3H:
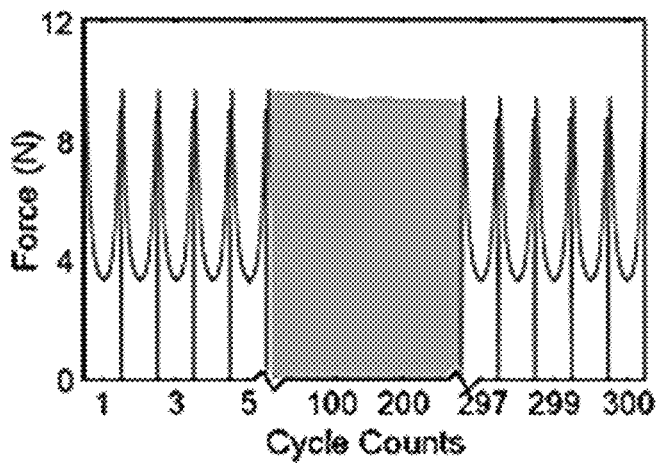

The embodiment illustrated above establishes the efficacy of using a cable-driven method (include cable-induced twisting) to tune the stiffness of curved origami in real-time. As for haptic perceptions, different positive stiffnesses reflect levels of hardness, while negative stiffness mimics the feeling of crushing an object or of falling (or slipping off). Thus, during the process of actively pressing a curved origami-based metamaterial with negative stiffness from a constant force, its acceleration becomes an essential metric for characterizing this feature. For the same curved origami-based metamaterial in FIG. 3(e) under β=120° and Δβ=0°, 35°, and 40°, the acceleration of a dead load (i.e., a constant force) can be as high as 0.6 G (with 1 G for free falling) as shown in FIG. 3(f). To guide the design of the curved origami-based metamaterial to achieve more pronounced mechanical perceptions, FIG. 3(g) provides the phase diagram of the normalized secant stiffness as the function of the crease angle α (30°<α<85°) and tuning angle Δβ for a prescribed initial folding angle β=120°, i.e., the actual angle with cable pulling, ranging from 0° to 120°. To harness the most pronounced stiffness perceptions, when the origami has both positive and negative stiffness ranges, only the maximum negative stiffness is chosen. When it has only the positive stiffness range, the maximum positive stiffness is adopted. From a practical perspective, angle α is a predetermined parameter as it defines the curved origami-based metamaterial pattern. For example, to obtain both positive stiffness and negative stiffness, the crease angle is set in a range between 55° and 85°, and the folding angle is tuned between 30° and 130°.

Consequently, this phase diagram provides a design (through angle α) and an operation guide (through tuning angle Δβ) to utilize curved origami-based metamaterial for stiffness sensory perceptions. Similar to elastic deformation during plate rotating or cable pulling, the deformation during cyclic pressing on top plate of the curved origami-based metamaterial is also elastic (FIG. 3(h)), in which both negative and positive stiffness can be clearly seen in each cycle.

Figure 2B:
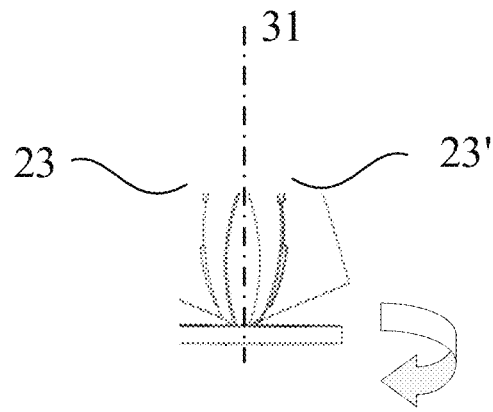
FIG. 2(b) illustrates a schematic diagram of two symmetrically disposed curved origami-based metamaterial according to embodiments of the present disclosure.

In some embodiments, the at least one piece of a curved origami-based metamaterial includes two pieces (e.g., a pair) of a curved origami-based metamaterial. As shown in FIG. 2(b), there are two pieces of curved origami-based metamaterial, curved origami-based metamaterial 23 and curved origami-based metamaterial 23', with one piece axial symmetric to the other piece, along the axial 31, providing a more stable structure when being used to construct haptic devices.

Figure 4:
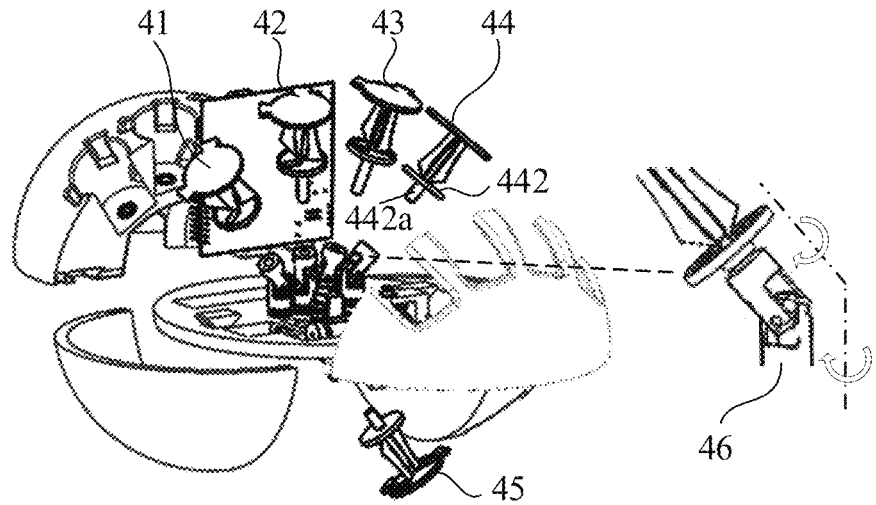
FIG. 4 illustrates an exemplary diagram of buttons formed by the origami-based contact member according to embodiments of the present disclosure.

In some embodiments, the origami-based contact member according to embodiments of the present disclosure is formed as a button. As shown in FIG. 4, five buttons, i.e., button 41, button 42, button 43, button 44, and button 45 are each formed by the origami-based contact member according to embodiments of the present disclosure. Furthermore, take button 44 for an example, the bottom plate 442 is circular-shaped and provided with a shaft 442a, which is rotatable by an actuation mechanism 46.

Figure 5:
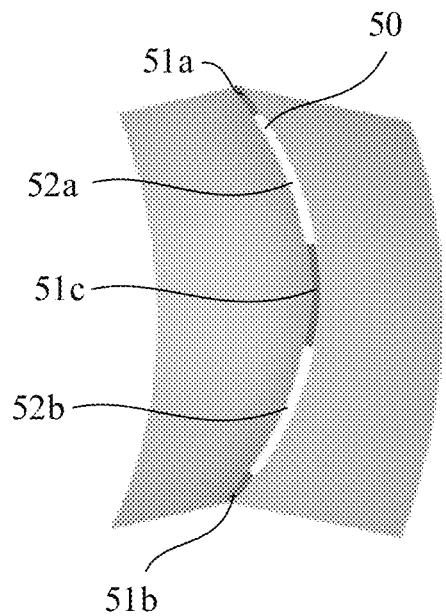
FIG. 5 illustrates the configuration of the single curved crease according to embodiments of the present disclosure.

In some embodiments, the single curved crease of the origami-based contact member in FIG. 4 may have a configuration that illustrated in FIG. 5. As shown in FIG. 5, the single curved crease 50 is configured by the following portions: two end extending portions, end extending portion 51a and end extending portion 51b, an intermediate extending portion 51c, and two circular arc-shaped cutting slots, circular arc-shaped cutting slot 52a and circular arc-shaped cutting slot 52b, each of which connects its adjacent end extending portion and the intermediate extending portion.

Figure 6A:
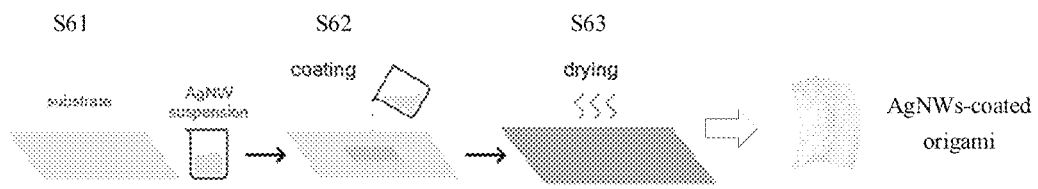
FIG. 6(a) illustrates the process of fabricating a substrate deposited with the silver nanowires (AgNWs) coated layer for the panel.

In some embodiments, such as the origami-based contact member in FIG. 4 or FIG. 5, the panel may be made of a substrate deposited with a sensing layer for sensing the loaded strain and modify its electrical property. FIG. 6(a) shows the process of fabricating a substrate deposited with the silver nanowires (AgNWs) coated layer as the sensing layer deposited on the substrate of the panel. Specifically, at step S61, the substrate and AgNWs suspension is prepared. At step S62, the AgNWs suspension is coated(applied) onto the surface of the substrate. And then at step S63, the suspension is dried in the oven for 6 hours to obtain the AgNWs-coated substrate. In some embodiments, the loaded strain of the panel may be represented by the height change, and the electrical property of the sensing layer, for example, may be represented by the relative resistance variation (ΔR/R0), thus the relationship of the sensed loaded strain and the electrical property of the sensing layer is presented in FIG. 6(b).

Figure 6B:
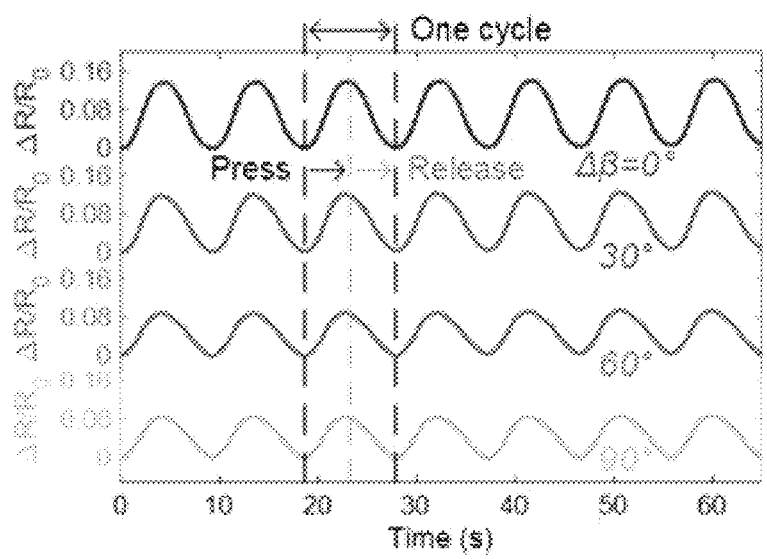
FIG. 6(b) illustrates the relative resistance variation ($\Delta R/R0$) of the sensing layer upon loaded strain at different folding angles.

FIG. 6(b) presents the relative resistance variation (ΔR/R0) of the sensing layer upon cyclic and active pressing on the top plate of the origami-based contact member (with 30% nominal strain for the height change) at different folding angles (i.e., β−Δβ, wherein Δβ=0°, 30°, 60° and 90° for β=120°). From FIG. 6(b) the feature of the electrical property modification can be observed: the variation of the relative resistance variation (ΔR/R0) presents positive correlation with the loaded strain.

Figure 7A:
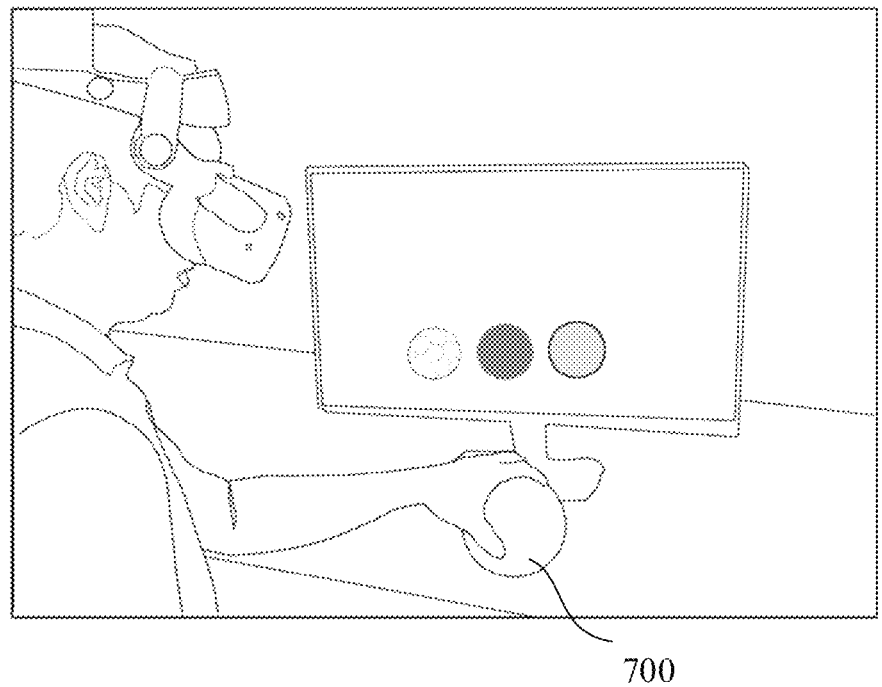
FIG. 7(a) illustrates an exemplary diagram of a user perceiving different stiffness of various objects in the virtual environment using the in-hand device according to embodiments of the present disclosure.
Figure 7B:
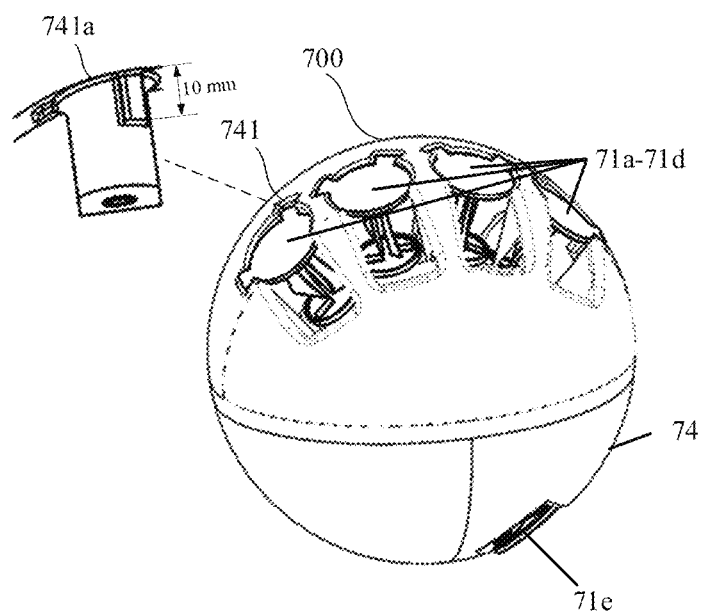
FIG. 7(b) illustrates a schematic diagram of partial composition of a haptic in-hand device according to embodiments of the present disclosure.

A haptic in-hand device for providing active mechanical haptics is also provided according to an embodiment of the present disclosure. FIG. 7(a) illustrates an exemplary diagram of a user perceiving different stiffness of various objects in the virtual environment using the in-hand device according to embodiments of the present disclosure. As shown in FIG. 7(b), the haptic in-hand device 700 comprises five origami-based contact members according to the present disclosure (origami-based contact member 71a-71e as shown in FIG. 7(b)), and the user's body site is finger or thumb (to perform the active grasping on the origami-based contact member of the haptic in-hand device 700, as shown in FIG. 7(a)).

In some embodiments, the haptic in-hand device 700 may include an actuation mechanism (not shown) and a control portion (not shown). Specifically, the control portion is configured to communicate with a VR/AR engine (not shown in FIG. 7(b)), so as to receive a stiffness tuning command indicating the current stiffness of a virtual object upon track the user's active grasping operation on the virtual object in a VR/AR scene, wherein the virtual object in the VR/AR scene is corresponding to the haptic in-hand device 700. The control portion is also configured to controlling the actuation mechanism in response to the stiffness tuning command, so as to rotate the shafts of the bottom plates of the button formed origami-based contact member 71a-71e to tune the stiffness to be perceived by the user's finger/thumb. Furthermore, the haptic in-hand device 700 also comprises a support shell 74 for housing the five origami-based contact members, the actuation mechanism, and the control portion, the support shell 74 is provided with five openings for exposing the top plates of the origami-based contact members to the outside.

As shown in FIG. 7(b), the support shell 74 has a spherical shape, the support shell 74 has five slots 741 for housing the five origami-based contact member 71a-71e, respectively, with each of slot 741 provided with slide guide portion 741a for confining the compression range (such as 10 mm) of the corresponding origami-based contact members.

Furthermore, the five origami-based contact members may be mounted within the support shell 74 according to the common gesture of human grasping, with the origami-based contact member 71e used for thumb is on an opposite side of the support shell 74 to the side of the other four fingers.

Figure 8:
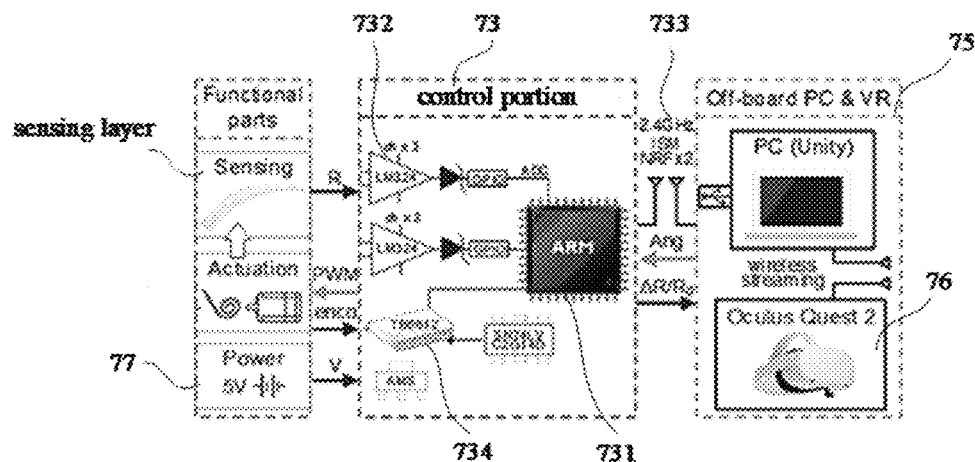
FIG. 8 illustrates a schematic diagram of partial composition of the control portion of a haptic in-hand device according to embodiments of the present disclosure.

As shown in FIG. 8, the control portion of the haptic in-hand device 700 according to embodiments of the present disclosure may also comprise a micro-controller 731, a sampling resistor module 732 and a wireless communication interface 733. In some embodiments, the sensing layer is configured to vary its resistance (shown as R in FIG. 8) when loaded with strain through pressing/releasing operation on the top plates of the origami-based contact members by the user's finger or thumb. In some other embodiments, the sampling resistor module 732 is coupled to the sensing layer and converts its varied resistance R into voltage change.

In some other embodiments, the micro-controller 731 is coupled to the sampling resistor module 732 and forwarded the voltage change to the VR/AR engine 75 via the wireless communication interface 733, so that the VR/AR engine 75 then transforms the voltage change to deformation of the virtual object and alters the corresponding VR/AR scene to be seen by the user via a VR/AR device 76. In addition, a power supply 77, such as a small 5V battery may be integrated into the supporting shell 74, to realize untethered control.

FIG. 9(a) illustrates an exploded-view schematic diagram of the actuation mechanism of the haptic in-hand device according to embodiments of the present disclosure. In some other embodiments, the control portion of the haptic in-hand device 700 may further comprise a motor drive module 734, accordingly, the actuation mechanism further comprises a motor 721 and a transmission system 722, as shown in FIG. 9(a) and FIG. 9(b).

The micro-controller 731 in FIG. 8 may further be configured to: if the deformation of the virtual object (not shown) brings about its change of current stiffness, receive a stiffness tuning command indicating the varied stiffness of a virtual object from the VR/AR engine 75, and transmitting a driving command to the motor drive module 734 in response to the stiffness tuning command. Furthermore, the motor drive module 734 may also be configured to actuate the motor 721 to transmit rotation via the transmission system 722 to the shafts of the bottom plates of the haptic in-hand devices to tune the stiffness to be perceived by the user's finger/thumb. In some embodiments, the change of current stiffness of the virtual object may comprise becoming crushed or falling away from the virtual object.

In some other embodiments, the micro-controller 731 may be further configured to determine the rotation amount of the motor 721 according to the varied stiffness of the virtual object indicated in the stiffness tuning command; and generating a driving command for the motor drive module 734 to rotate the motor 721 by the determined rotation amount.

FIG. 9(b) illustrates a top view schematic diagram of the transmission system of the actuation mechanism according to embodiments of the present disclosure. As shown in FIG. 9(b), the motor 721 may comprise a driving shaft 721a, the transmission system 722 may comprise a worm screw 722a mounted and fixed to the driving shaft 721a of the motor 721, a spool 722b that screwed with the worm screw 722a, at least four rollers 722c, five universal joint 722d, and a cable 722e, wherein, the at least four rollers 722c each have axes parallel to that of the spool 722b while vertical to that of the driving shaft 721a and the worm screw 722a, and are connected with the bottom plates of the five origami-based contact member 71a-71e via at least four universal joint 722d, the cable 722e is winded around the spool 722b and the at least four rollers 722c serially, so that, the worm screw 722a may rotate as the driving shaft 721a rotates, and delivers the rotation to the spool 722b, which turns the cable 722e and thus turns the at least four rollers 722c, so as to transmit rotations to the bottom plates of the five origami-based contact member 71a-71e synchronously. The universal joints may be used for transmitting the rotations about the vertical axis between the top and bottom plates of curved origami-based contact members.

In some other embodiments, the transmission system 722 may comprise four rollers 722c, and for the sake of saving space, the origami-based contact member 71e used for thumb and the origami-based contact member used for middle finger (such as 71b) are connected with an identical roller 722c. In this manner, rotations of the bottom plates of the five-button formed origami-based contact members can be synchronously controlled by one motor 721, performing a SI-MO (single input-multiple output) actuation strategy based on cable routing, leading to a more compact and lightweight structure. In FIG. 9(b), the bold arrow denotes the driving of spool 722b, and the thin ones denote follow-up rolling of multiple roller 722c.

In some other embodiments, the transmission system 722 may further comprise a tension roller 722f, the section of the cable 722e between the spool 722b and the four rollers 722c is tensed against the tension roller 722f. The tension roller 722f may be used for the pre-tension of the cable 722e, to avoid the slide between the cable 722e and the multiple rollers 722c.

In addition, due to the self-locking characteristics of the worm screws, the structure of haptic in-hand device 700 can withstand the torque of the relative rotations between the top and bottom plates of the curved origami-based contact member and maintain states of prescribed stiffness, rendering a more energy-efficient system.

The object-like haptic in-hand device 700 may provide human-triggered, active mechanical haptics with stiffness perceptions covering positive and negative ranges. The micro-controller 731 of the haptic in-hand device 700 connects the virtual environment and actual perceptions and achieves what a user sees is what the user feels sensation by synchronously providing various stiffness perceptions based on seen virtual objects and guiding their variations (not limited to shapes) in the virtual environment based on active user input through pressing the buttons. As an example, for a soft ball in the virtual environment, the user may feel its softness, and feel its deformation and see its deformed appearance upon active pressing.

There are various scenarios where a user grasps various virtual objects (e.g., elastic vs. easily crushed, soft vs. rigid balls) and perceives their corresponding stiffness through the haptic in-hand device 700. The two-way connection of the haptic in-hand device 700 between the user and virtual object renders the object in the virtual environment perceptible to the user and in turn deformable in the virtual world. This perception is triggered by the user's active grasping, which is similar to interactions with real objects in the physical environment, thus providing an improved immersive experience.

Figure 7C:
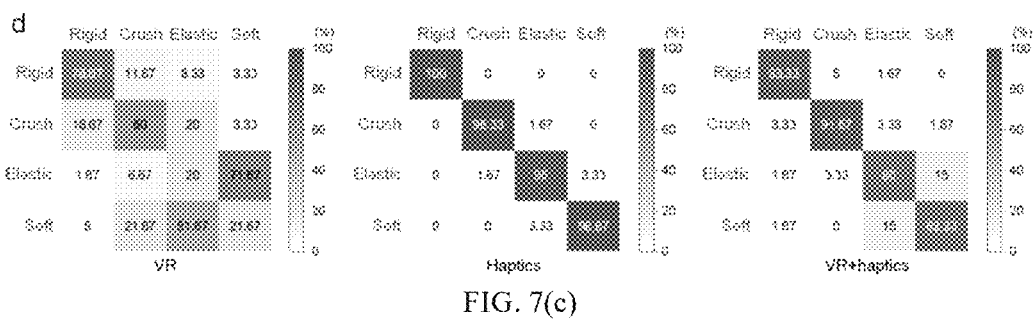
FIG. 7(c) illustrates the confusion matrices showing identification rates of 12 participants under three different interaction methods.

To evaluate the haptic perceptions empowered by the haptic in-hand device according to the present disclosure, 12 participants (Methods section "Stiffness perception evaluation" for details) were recruited to identify 4 different objects of spherical shapes with distinct mechanical properties (i.e., "rigid" with high stiffness, "elastic" with relatively lower stiffness, "soft" with the lowest stiffness, and "crushed" with negative stiffness) using three different means: 1) sole virtual environment through visual information (i.e., only VR glass), 2) sole active touching (i.e., only the present haptic device), and 3) combined information of both visual and touching (VR glass+the present haptic device). FIG. 7(c) presents the confusion matrices of these three conditions, in which columns and rows correspond to the preset properties and the identified ones by the participants. Unsurprisingly, with sole visual information from the VR glass, the participants are unsure about the mechanical properties of the virtual objects. The highest identification rate is below 77%, and of note, below 22% when identifying two similar objects (namely, "elastic" and "soft"). In contrast, the identification rates are almost 100% while just using the present haptic device, indicating that this device can replicate the stiffness information. Interestingly, identification rates dropped when participants used the haptic in-hand device combined with the visual information from the VR glass, i.e., over 91% for "rigid" and "crush" and just over 80% for "elastic" and "soft", which may suggest that in terms of stiffness perception, touching is more dominant than visual information because the latter is unreliable and at times can even be misleading.

Figure 7D:
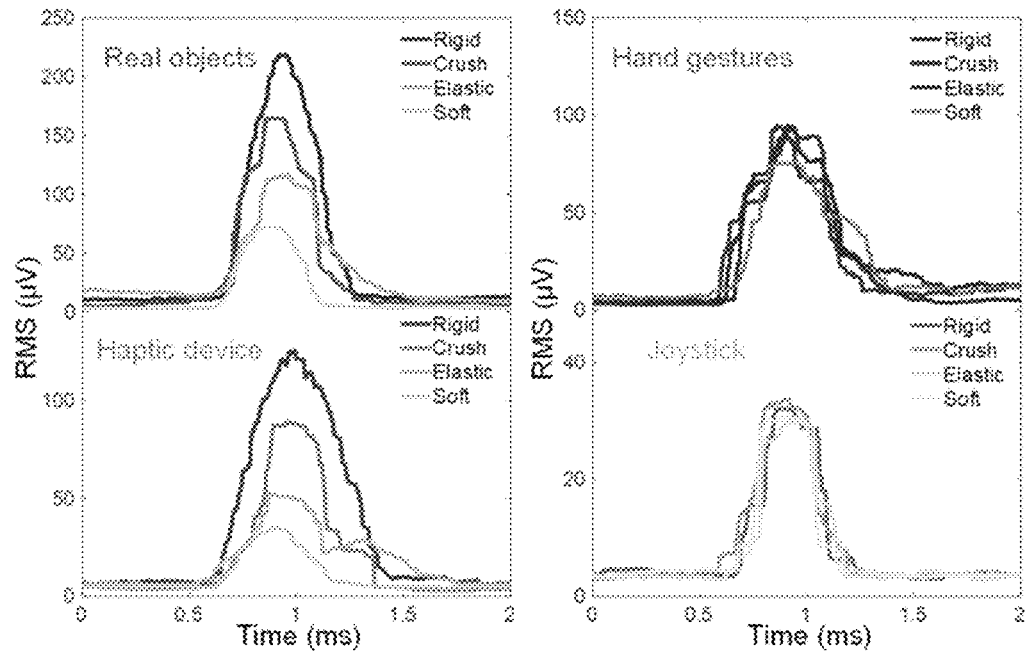
FIG. 7(d) illustrates physiological signals (EMG) of the upper limb when the users grasp different real objects and virtual ones under three in-hand conditions.

To evaluate the haptic perceptions more objectively, physiological signals from the electrical activity of the muscles (i.e., an electromyogram, or EMG) were recorded when users tried to grasp four objects with different stiffness using four different means, with one in physical and three in virtual environments. In the physical environment, four balls were used (a rigid wooden ball, an easily buckled plastic ball, an elastic #1 soccer ball with higher pressure, and a soft #1 soccer ball with lower pressure), which formed the benchmark of the evaluation. In the virtual environment, when the VR glass visually presents four balls (stiff, easily broken, elastic, and soft), three means of grasping were presented: 1) using the present haptic in-hand device, 2) just hand gesture without touching anything in the real physical world, and 3) using a joystick, which is currently a common interactive tool. FIG. 7(d) shows the RMS (root mean square) values of the EMG signals upon grasping of various objects (real in physical world or virtual in VR world) under different in-hand conditions. The results clearly show that the present haptic in-hand device presents a very similar tendency to those based on real objects, i.e., higher stiffness stimulates higher EMG voltage, and the crushing motion tends to rapidly decrease the value. In contrast, the values for just the hand gesture and the joystick are indistinguishable, lacking of authentic haptic perceptions from a muscle's viewpoint. A statistical analysis further demonstrates that the present in-hand device shows significant performance ($P<0.001$ for most) in simulating different mechanical stiffnesses when compared to real objects, providing distinguishable stiffness perceptions, while the hand gesture and the conventional joystick generate statistically insignificant perceptions ($P>0.05$) to users.

Another origami-based contact member used for active mechanical haptics is also provided according to an embodiment of the present disclosure. FIG. 10(a) illustrates a schematic diagram of composition of another origami-based contact member used for active mechanical haptics according to embodiments of the present disclosure. With reference to FIG. 10(a), the origami-based contact member 1000 may comprise a top plate 1010 exposed to be contacted by a user's body site, a bottom plate 1020, and a plurality of pieces of curved origami-based metamaterial 1030 interposed therebetween and arranged in rows, and cables 1400 provided corresponding to the rows, so that each row has an independent cable 1400. Wherein, each piece of the curved origami-based metamaterial 1030 has a top end 1030a and a bottom end 1030b, the top end 1030a may be fixed to the top plate 1010 and the bottom end 1030b may be fixed to the bottom plate 1020.

Figure 10B:
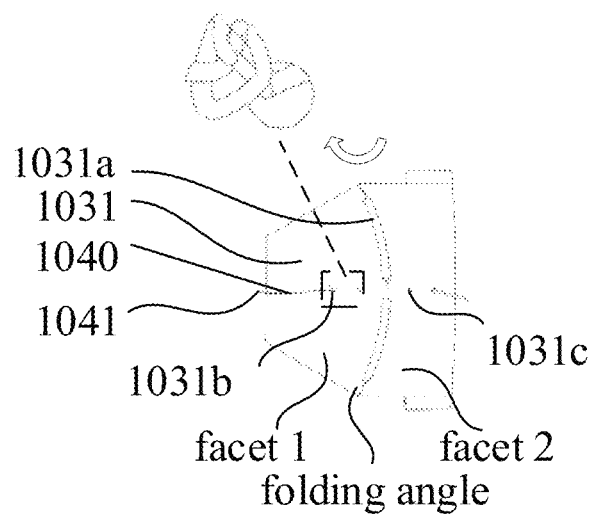
FIG. 10(b) illustrates a schematic diagram of the curved origami-based metamaterial of the origami-based contact member according to FIG. 10(a).

FIG. 10(b) illustrates a schematic diagram of the curved origami-based metamaterial of the origami-based contact member 1000. As shown in FIG. 10(b), each piece of the curved origami-based metamaterial 1030 comprises a panel 1031 having a single curved crease 1031a extending in its longitudinal direction, which divides the panel 1031 into two facets (facet 1 and facet 2) at its two opposite sides, the panel 1031 is configured to be folded along the single curved crease 1031a to form a folding angle between facet 1 and facet 2. Furthermore, a first hole 1031b is cut in one of the two facets (for example facet 1) and a second hole 1031c is cut in the other of the two facets (for example facet 2). In addition, for each row of the pieces of curved origami-based metamaterial 1030, the corresponding independent cable 1040 passes through the two holes cut in panels consequently in series, with its side behind each panel 1031 knotted, so as to be pulled/released synchronously to adjust the folding angles of the panels to achieve a variable stiffness when loaded in a vertical axis between the top and bottom plates, covering positive stiffness to negative stiffness, to be perceived by the user's body site via contact with the top plate 1010.

Figure 11:
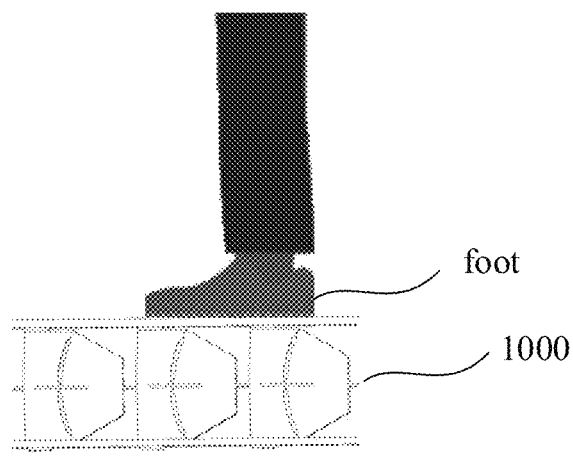
FIG. 11 illustrates a schematic diagram of a stepping member formed with the origami-based contact member according to embodiments of the present disclosure.

Specifically, as shown in FIG. 11, the origami-based contact member 1000 may be formed as a stepping member, and the body site is foot.

Similar to the origami-based contact member 200 shown in FIG. 2(a), the single curved crease 1031a of origami-based contact member 1000 is configured by the following portions: two end extending portions, an intermediate extending portion, and two circular arc-shaped cutting slots, each of which connects its adjacent end extending portion and the intermediate extending portion.

As shown in FIG. 10(*a*), the origami-based contact member 1000 may further comprise a plurality of pairs of collars and pillars, the pillars are fixed and distributed on the bottom plate 1020 at the periphery of the plurality of pieces of curved origami-based metamaterial 1030, and the collars are fixed to the bottom side of the top plate 1010 corresponding to the pillars, so that each collar is slidably sleeved onto the corresponding pillar.

The plurality of pairs of collars and pillars may be used to constrain the motion of the haptic platform (such as the stepping member in FIG. 11) only in the vertical direction upon users' active stepping. Furthermore, the sliding range between the collars and pillars is preset to confining the depression range of the origami-based contact member 1000.

The origami-based contact member 1000 may further comprise a distance sensor (not shown), which is disposed between the top plate 1010 and the bottom plate 1020 to detect a displacement of the top plate 1010 in the vertical direction. For example, the distance sensor may be disposed on the bottom plate 1020.

In addition, as shown in FIG. 10(*a*) and FIG. 10(*b*), each cable 1040 is independent from each other, and has a free end 1041 extending out of the proximal panel to be pulled/released independently.

Figure 12:
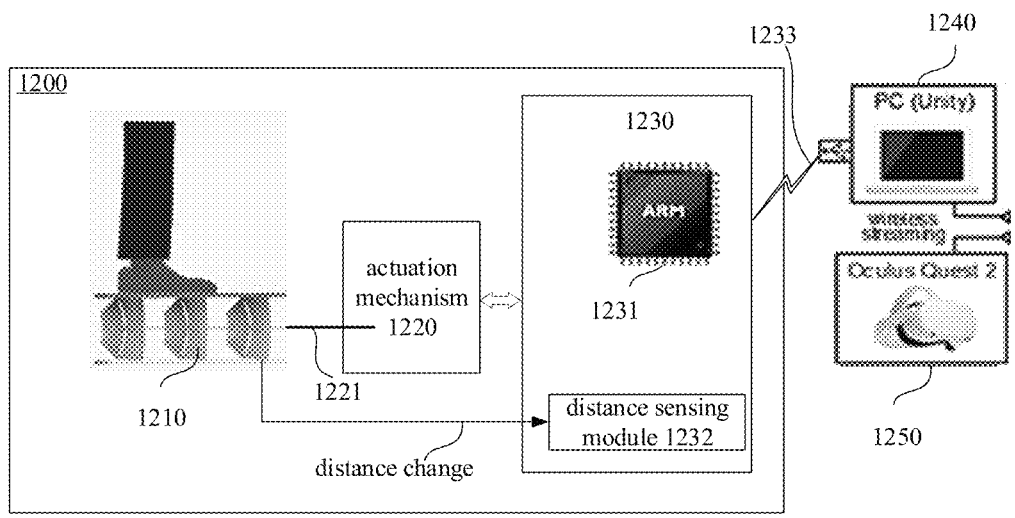
FIG. 12 illustrates a schematic diagram of partial composition of the control portion of a haptic stepping device according to embodiments of the present disclosure.
Figure 13A:
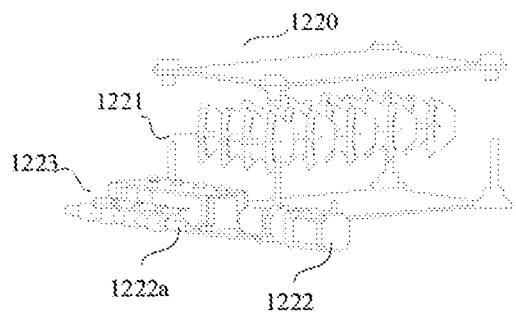
FIG. 13(a) illustrates an exploded-view schematic diagram of the actuation mechanism of the haptic stepping device according to embodiments of the present disclosure.
Figure 13B:
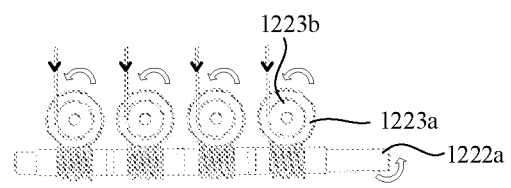
FIG. 13(b)-FIG. 13(d) illustrate a schematic diagram of the transmission system of the actuation mechanism and synchronous actuation of the curved origami-based metamaterial according to embodiments of the present disclosure.
Figure 13C:
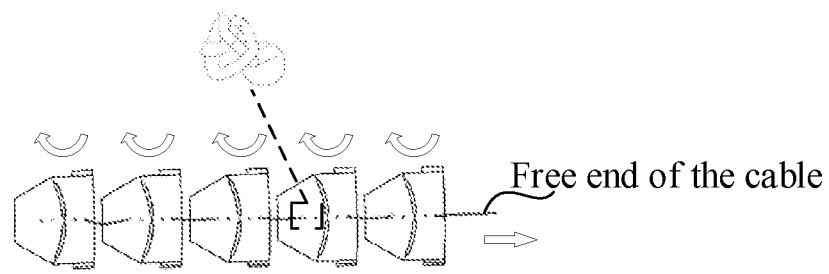
Figure 13D:
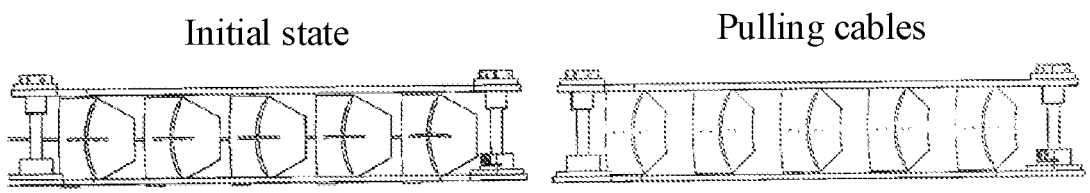

A haptic stepping device for providing active mechanical haptics is provided according to an embodiment of the present disclosure. As shown in FIG. 12, haptic stepping device 1200 for providing active mechanical haptics may comprise the origami-based contact member 1210 that illustrated in FIG. 10(*a*), FIG. 10(*b*) or FIG. 11, and specifically, the user's body site is foot.

In some other embodiments, the haptic stepping device 1200 may also include an actuation mechanism 1220 including the cables 1221, and a control portion 1230. Wherein, the control portion 1230 may be configured to communicate with a VR/AR engine 1240, so as to receive a stiffness tuning command indicating the current stiffness of a virtual object upon track the user's active stepping operation on the virtual object in a VR/AR scene. The control portion 1230 may further be configured to control the actuation mechanism 1220 in response to the stiffness tuning command, so as to pull/release the cables 1221 synchronously to tune the stiffness to be perceived by the user's foot.

In some other embodiments, the control portion 1230 may further comprise a micro-controller 1231, a distance sensing module 1232 and a wireless communication interface 1233. Wherein, the distance sensing module 1232 may be configured to convert the sensed distance change caused by the user's active stepping on the top plate by the user's foot, into voltage change, and the micro-controller 1231 may be coupled to the distance sensing module 1232 and forwarded the voltage change to the VR/AR engine via the wireless communication interface 1233, so that the VR/AR engine then can transform the voltage change to deformation of the virtual object and alter the corresponding VR/AR scene to be seen by the user via a VR/AR device 1250.

FIG. 13(*a*) illustrates an exploded-view schematic diagram of partial composition of the actuation mechanism of the haptic stepping device, and FIG. 13(*b*), FIG. 13(*c*) and FIG. 13(*d*) illustrate a schematic diagram of the transmission system of the actuation mechanism according to embodiments of the present disclosure. Similar to the haptic in-hand device 700, the control portion 1230 may further comprise a motor drive module (not shown), the actuation mechanism 1220 may further comprise a motor 1222 and a transmission system 1223 including the cables 1221 (as shown in FIG. 13(*a*)), and the micro-controller 1231 may be further configured to: if the deformation of the virtual object brings about its change of current stiffness, receive a stiffness tuning command indicating the varied stiffness of a virtual from the VR/AR engine 1240 (shown in FIG. 12), and transmitting a driving command to the motor drive module in response to the stiffness tuning command. In some other embodiments, the motor drive module may be further configured to actuate the motor 1222 to transmit pulling/releasing by the transmission system 1223 to the cables 1221 to tune the stiffness to be perceived by the user's foot. In some embodiments, the change of current stiffness of the virtual object may comprise becoming crushed or falling away from the virtual object. The motor 1222 may comprise a driving shaft 1222*a* (as shown in FIG. 13(*b*)), the transmission system 1223 may accordingly comprise a worm screw 1223*a* mounted and fixed to the driving shaft 1222*a* of the motor 1222, and rollers 1223*b* provided corresponding to the rows (FIG. 13(*b*)). Furthermore, the rollers 1223*b* each have axes vertical to that of the driving shaft 1222*a* and the worm screw 1223*a* and are formed with threads to be screwed with the worm screw 1223*a* together, and each cable 1221 is winded around the corresponding roller 1223*b*, wherein, the worm screw 1223*a* may rotate as the driving shaft 1222*a* rotates, and delivers the rotation to the rollers 1223*b*, which turn the cables 1221 to pull/release the free ends of the cables synchronously (1 input 5 output as shown in FIG. 13(*c*) and FIG. 13(*d*)).

Therefore, for the haptic stepping device 1200, a two-step transmission system consisting of a multi-head worm screws transmission and multi-knotted cable-driven transmissions is designed, where the former transmits the rotation from the motor to the four rollers for simultaneously pulling four independent cables, and the latter converts each cable pulling to simultaneous folding of five curved origami-based metamaterial through five knots evenly located behind the five moving panels. In this manner, simultaneous control of the curved origami-based metamaterial tessellation with 20 members located in a 4×5 matrix can be achieved through only one motor, forming an easily manipulated, energy-efficient actuation system similar to that of the haptic in-hand device 700.

In some other embodiments, the micro-controller 1231 may be further configured to determine the rotation amount of the motor 1222 according to the varied stiffness of the virtual object indicated in the stiffness tuning command; and generate a driving command for the motor drive module to rotate the motor 1222 by the determined rotation amount.

Benefitting from the scalability of the origami structure, curved origami-based metamaterial is constructed at multiple sizes using different materials (e.g., plastic or steel), and then integrated into two haptic devices for experiences, namely, a haptic in-hand device to elicit the touching sensation and a haptic stepping device such as stepping mat to generate a whole-body sensation (FIG. 1(*a*) and FIG. 1(*b*)). These two experiences result in more realistic sensory perceptions by successfully simulating both the physiological and psychological reactions of users, and they promise to deliver a highly immersive virtual experience, with potential for broad applications in entertainment, teleoperation, medical therapy, and rehabilitation.

Figure 14:
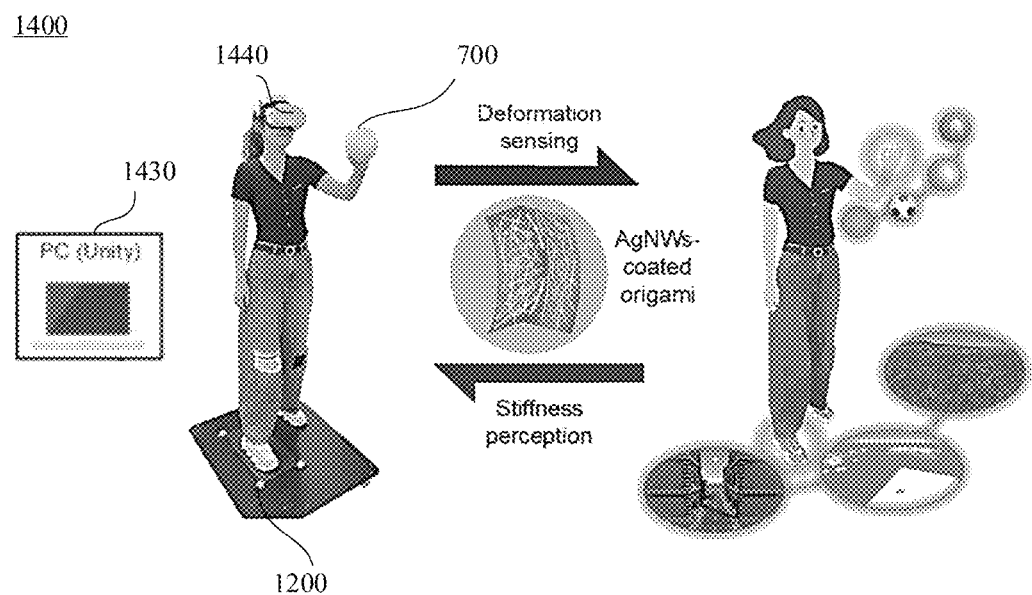
FIG. 14 illustrates a schematic diagram of partial composition of the immersive VR/AR system for providing active mechanical haptics according to embodiments of the present disclosure.

An immersive VR/AR system for providing active mechanical haptics is also provided according to an embodiment of the present disclosure. As shown in FIG. 14, the immersive VR/AR system 1400 may comprise the haptic in-hand device 700 for providing active mechanical haptics of any embodiments illustrated above, alternatively or additionally, the haptic stepping device 1200 for providing active mechanical haptics of any embodiments illustrated above as the haptic assembly.

The VR/AR engine 1430 may be configured to communicate with both the VR/AR device 1440 and the haptic device 700 and/or the haptic device 1400, transmit a stiffness tuning command indicating the current stiffness of a virtual object upon track the user's active grasping operation and/or the active stepping operation on the virtual object in a VR/AR scene to the haptic assembly. In some other embodiments, the VR/AR engine 1430 may also be configured to transmit stream related to the VR/AR scene to the VR/AR device 1440.

In some embodiments, the VR/AR device 1440 may be configured to communicate with the VR/AR engine 1430 to receive stream related to the VR/AR scene and presenting VR/AR scene to the user accordingly, and to track the user's active grasping and/or active stepping operation on the virtual object in the VR/AR scene.

As to the immersive VR/AR system 1400, the control portion of the haptic in-hand device 700 may comprise a micro-controller, a sampling resistor module and a wireless communication interface, wherein, each panel is made of a substrate deposited with a sensing layer for sensing the loaded strain and vary its resistance when loaded with strain through pressing/releasing operation on the top plates by the user's finger or thumb or foot; the sampling resistor module is coupled to the sensing layer and converts its varied resistance into voltage change; and the micro-controller is coupled to the sampling resistor module and forwarded the voltage change to the VR/AR engine via the wireless communication interface. Detailed realization has been illustrated with reference to figures related to the haptic in-hand device 700, and thus is not repeated here.

The control portion of the haptic stepping device 1200 may comprise a micro-controller, a distance sensing module and a wireless communication interface, wherein, the distance sensing module is configured to convert the sensed distance change caused by the user's active stepping on the top plate by the user's foot, into voltage change; and the micro-controller is coupled to the distance sensing module and forwarded the voltage change to the VR/AR engine via the wireless communication interface. Detailed realization has been illustrated with reference to figures related to the haptic stepping device 1200, and thus is not repeated here.

The VR/AR engine 1430 may be further configured to transform the voltage change to deformation of the virtual object and alters the corresponding stream related to the VR/AR scene.

In the immersive VR/AR system 1400, combining the haptic perceptions generated from actively pressing the curved origami with the synchronized visual information from conventional VR devices, a highly immersive, touchable, closed-loop virtual world can be constructed. Here, a user can actively and physically feel what she/he sees in VR by touching or pressing motions initiated by the user through haptic devices, with curved origami as the key stiffness tuning component. The virtual scenarios (e.g., city view, ice surface, grassland) act as an input to the haptic device (e.g., the mat and the ball). Based on this input, the folding angle is tuned by the integrated motor in $\Delta\beta$ to simulate the expected stiffness response of what the user sees in the VR device. Thus, the user can feel the mechanical stiffness of the objects seen in the VR device in real time through active hand-grasping or through body-centered, foot-stepping actions. On the other hand, the user's active interaction with the curved origami (e.g., by pressing) is recorded as resistance change, which is achieved by way of silver nanowires (AgNWs) as a sensing layer deposited on the origami panel. Such changes are then converted into voltage variations using the on-board microcontroller. The voltage variations on the haptic device wirelessly communicates with the virtual environment engine (e.g., Unity) in a PC and then wirelessly streams into the VR device to render necessary changes in real time, such as breaking an icy surface while the user triggers a negative stiffness. FIG. 6(*b*) presents the relative resistance variation ($\Delta R/R_0$) of the sensing layer upon cyclic and active pressing on top of the curved origami (with 30% nominal strain for the height change) at different folding angles ($\Delta\beta=0°$, 30°, 60° and 90° for $\theta=120°$). Here two features are observed: first, the variation of the resistance has high repeatability during cyclic pressing and releasing, and second, folding angle $\Delta\beta$ shows a negligible influence, which is important to use a universal algorithm (i.e., $\Delta\beta$ independent algorithm) to alter the virtual environment. Thus, upon active human interaction, the virtual environment is changed according to the measured deformation through changes in electrical resistance. The experiment results show that the device possesses very stable virtual-real synchronization via its wireless transmission system. Note that the integrated motor-driven cable is only activated when the folding angle of the curved origami needs to be altered according to the virtual scenario. It then provides the various stiffness perceptions to the user without the need for further complex control algorithms or additional actuation. Therefore, the power dissipation of about 150 mW is only produced when tuning the stiffness, leading to an energy-efficient system for human-triggered active haptics.

An origami-based contact member used for active mechanical haptics is also provided according to an embodiment of the present disclosure. The origami-based contact member may comprise a top plate, a bottom plate, and at least one piece of a curved origami-based metamaterial interposed therebetween, wherein, the curved origami-based metamaterial may comprise a panel, and a variable stiffness of the curved origami-based metamaterial is achieved by twisting the panel (similar to FIG. 2(*b*)), or, pulling/releasing the panel by a connecting member passing through the panel (similar to FIG. 10(*a*)), wherein the variable stiffness covering positive stiffness to negative stiffness.

The origami-based contact member that twisting the panel and the origami-based contact member that pulling/releasing the panel may be made of different materials at different scales, but can be tuned to have different stiffness responses using the same working principles.

The origami-based contact members, the haptic in-hand or stepping devices according to the present disclosure adopt delicate curved origami-based metamaterial, allow users to actively generate and sense mechanical touching sensations with controllable stiffness, ranging from hard to soft and from positive to negative. And the immersive VR/AR system with the haptic in-hand and/or stepping devices integrated therein may provide precise and stable virtual-real synchronization with active mechanical haptics, achieving a combination of visual, audial, and active touching sensory perceptions in AR/VR haptic experiences so that providing many possibilities for potential applications, including daily entertainment, industrial teleoperation, psychological therapy, and physical rehabilitation.

The above description is intended to be illustrative and not limiting. For example, the above-mentioned examples (or one or more solutions thereof) may be used in combination with each other. For example, those of ordinary skill in the art may use other embodiments when reading the above-mentioned description. In addition, in the above-mentioned specific embodiments, various features may be grouped together to simplify the present disclosure. This should not be interpreted as an intention that features of the disclosure that do not require protection are necessary for any of the claims. Rather, the subject matter of the present disclosure may be less than the full range of features of a particular disclosed embodiment. Therefore, the following claims are incorporated herein as examples or embodiments in the particular embodiment, each claim stands alone as a separate embodiment, and it is contemplated that these embodiments may be combined with each other in various combinations or permutations. The scope of the present disclosure shall be determined by reference to the full scope of the appended claims and equivalent forms to which these claims are entitled.

The above embodiments are only exemplary embodiments of the present disclosure, and are not used to limit the present disclosure. The scope of protection of the invention is defined by the claims. Those skilled in the art can make various modifications or equivalent substitutions to the invention within the essence and protection scope of the disclosure, and such modifications or equivalent substitutions should also be regarded as falling within the protection scope of the invention.

What is claimed is:

1. An origami-based contact member used for active mechanical haptics, comprising:
    a top plate, a bottom plate, and at least one piece of a curved origami-based metamaterial interposed therebetween, with its top end fixed to the top plate and its bottom end fixed to the bottom plate, the top plate is exposed to be contacted by a user's body site,
    wherein, the curved origami-based metamaterial comprises a panel having a single curved crease extending in its longitudinal direction, which divides the panel into two facets at its two opposite sides, the panel is configured to be folded along the single curved crease to form a folding angle between the two facets, and
    wherein the folding angle is configured to be adjusted by rotating the bottom plate to achieve a variable stiffness when loaded in a vertical axis between the top and bottom plates, covering positive stiffness to negative stiffness, to be perceived by the user's body site via contact with the top plate.

2. The origami-based contact member of claim 1, wherein the origami-based contact member is formed as a button.

3. The origami-based contact member of claim 2, wherein the bottom plate is circular-shaped and provided with a shaft, which is rotatable by an actuation mechanism.

4. The origami-based contact member of claim 3, wherein the single curved crease is configured by the following portions: two end extending portions, an intermediate extending portion, and two circular arc-shaped cutting slots, each of which connects its adjacent end extending portion and the intermediate extending portion.

5. The origami-based contact member of claim 3, wherein the panel is made of a substrate deposited with a sensing layer for sensing the loaded strain and modify its electrical property.

6. A haptic in-hand device for providing active mechanical haptics, comprising:
    five origami-based contact members of claim 5, wherein the user's body site is finger or thumb;
    an actuation mechanism and a control portion, wherein the control portion is configured to: communicate with a VR/AR engine, so as to receive a stiffness tuning command indicating the current stiffness of a virtual object upon track the user's active grasping operation on the virtual object in a VR/AR scene; controlling the actuation mechanism in response to the stiffness tuning command, so as to rotate the shafts of the bottom plates to tune the stiffness to be perceived by the user's finger/thumb; and
    a support shell for housing the five origami-based contact members, the actuation mechanism, and the control portion, the support shell is provided with five openings for exposing the top plates to the outside.

7. The haptic in-hand device of claim 6, wherein:
    the control portion comprises a micro-controller, a sampling resistor module and a wireless communication interface,
    the sensing layer is configured to vary its resistance when loaded with strain through pressing/releasing operation on the top plates by the user's finger or thumb;
    the sampling resistor module is coupled to the sensing layer and converts its varied resistance into voltage change; and
    the micro-controller is coupled to the sampling resistor module and forwarded the voltage change to the VR/AR engine via the wireless communication interface, so that the VR/AR engine then transforms the voltage change to deformation of the virtual object and alters the corresponding VR/AR scene to be seen by the user via a VR/AR device.

8. The haptic in-hand device of claim 7, wherein:
    the control portion further comprises a motor drive module, the actuation mechanism comprises a motor and a transmission system,
    the micro-controller is further configured to: if the deformation of the virtual object brings about its change of current stiffness, receive a stiffness tuning command indicating the varied stiffness of a virtual object from the VR/AR engine; transmitting a driving command to the motor drive module in response to the stiffness tuning command; and
    the motor drive module is further configured to actuate the motor to transmit rotation via the transmission system to the shafts of the bottom plates to tune the stiffness to be perceived by the user's finger/thumb.

9. The haptic in-hand device of claim 8, wherein the change of current stiffness of the virtual object comprises becoming crushed or falling away from the virtual object.

10. The haptic in-hand device of claim 8, wherein the motor comprises a driving shaft, the transmission system comprises a worm screw mounted and fixed to the driving shaft of the motor, a spool screwed with the worm screw, at least four rollers, five universal joints, and a cable, and
    wherein, the at least four rollers each have axes parallel to that of the spool while vertical to that of the driving shaft and the worm screw, and are connected with the bottom plates of the five origami-based contact members via at least four universal joints, the cable is winded around the spool and the at least four rollers serially, so that, the worm screw rotates as the driving shaft rotates, and delivers the rotation to the spool, which turns the cable and thus turns the at least four rollers, so as to transmit rotations to the bottom plates of the five origami-based contact members synchronously.

11. The haptic in-hand device of claim 10, wherein the transmission system comprises four rollers, and the origami-based contact members used for thumb and middle finger are connected with an identical roller.

12. The haptic in-hand device of claim 10, wherein the transmission system further comprises a tension roller, the section of the cable between the spool and the four rollers is tensed against the tension roller.

13. The haptic in-hand device of claim 8, wherein the micro-controller is further configured to: determining the rotation amount of the motor according to the varied stiffness of the virtual object indicated in the stiffness tuning command; and generating a driving command for the motor drive module to rotate the motor by the determined rotation amount.

14. The haptic in-hand device of claim 6, wherein the support shell has a spherical shape, the support shell has five slots for housing the five origami-based contact members, respectively, with each of slot provided with slide guide portion for confining the compression range of the corresponding origami-based contact member.

15. The haptic in-hand device of claim 14, wherein the five origami-based contact members are mounted within the support shell according to the common gesture of human grasping, with the origami-based contact member used for thumb is on an opposite side of the support shell to the side of the other four fingers.

16. An immersive VR/AR system for providing active mechanical haptics, comprising:
the haptic in-hand device for providing active mechanical haptics of claim 6;
the VR/AR engine, which is configured to: communicate with both the VR/AR device and the haptic device; transmit a stiffness tuning command indicating the current stiffness of a virtual object upon track the user's active grasping and/or active stepping operation on the virtual object in a VR/AR scene to the haptic assembly; and transmitting stream related to the VR/AR scene to the VR/AR device; and
the VR/AR device, which is configured to communicate with the VR/AR engine to receive stream related to the VR/AR scene and presenting VR/AR scene to the user accordingly, and to track the user's active grasping and/or active stepping operation on the virtual object in the VR/AR scene.

17. The immersive VR/AR system of claim 16, wherein the control portion of the haptic in-hand device comprises: a micro-controller, a sampling resistor module and a wireless communication interface, wherein, each panel is made of a substrate deposited with a sensing layer for sensing the loaded strain and vary its resistance when loaded with strain through pressing/releasing operation on the top plates by the user's finger or thumb or foot; the sampling resistor module is coupled to the sensing layer and converts its varied resistance into voltage change; and the micro-controller is coupled to the sampling resistor module and forwarded the voltage change to the VR/AR engine via the wireless communication interface,
wherein the control portion of the haptic stepping device comprises: a micro-controller, a distance sensing module and a wireless communication interface, wherein, the distance sensing module is configured to convert the sensed distance change caused by the user's active stepping on the top plate by the user's foot, into voltage change; the micro-controller is coupled to the distance sensing module and forwarded the voltage change to the VR/AR engine via the wireless communication interface, and
wherein the VR/AR engine is further configured to transform the voltage change to deformation of the virtual object and alters the corresponding stream related to the VR/AR scene.

18. The origami-based contact member of claim 1, wherein the at least one piece of a curved origami-based metamaterial includes two pieces of a curved origami-based metamaterial, with one piece axial symmetric to the other piece.

19. An origami-based contact member used for active mechanical haptics, comprising: a top plate exposed to be contacted by a user's body site, a bottom plate, and a plurality of pieces of curved origami-based metamaterial interposed therebetween and arranged in rows, and cables provided corresponding to the rows, so that each row has an independent cable,
wherein each piece of the curved origami-based metamaterial has a top end and a bottom end, the top end is fixed to the top plate and the bottom end is fixed to the bottom plate,
wherein each piece of the curved origami-based metamaterial comprises a panel having a single curved crease extending in its longitudinal direction, which divides the panel into two facets at its two opposite sides, the panel is configured to be folded along the single curved crease to form a folding angle between the two facets,
wherein a first hole is cut in one of the two facets and a second hole is cut in the other of the two facets,
wherein for each row of the pieces of curved origami-based metamaterial, the corresponding independent cable passes through the two holes cut in panels consequently in series, with its side behind each panel knotted, so as to be pulled/released synchronously to adjust the folding angles of the panels to achieve a variable stiffness when loaded in a vertical axis between the top and bottom plates, covering positive stiffness to negative stiffness, to be perceived by the user's body site via contact with the top plate.

20. The origami-based contact member of claim 19, wherein
the origami-based contact member is formed as a stepping member, and the body site is foot.

21. The origami-based contact member of claim 20, further comprising a distance sensor, which is disposed between the top plate and the bottom plate to detect a displacement of the top plate in the vertical direction.

22. The origami-based contact member of claim 19, wherein the single curved crease is configured by the following portions: two end extending portions, an intermediate extending portion, and two circular arc-shaped cutting slots, each of which connects its adjacent end extending portion and the intermediate extending portion.

23. The origami-based contact member of claim 19, further comprising a plurality of pairs of collars and pillars, the pillars are fixed and distributed on the bottom plate at the periphery of the plurality of pieces of curved origami-based metamaterial, and the collars are fixed to the bottom side of the top plate corresponding to the pillars, so that each collar is slidably sleeved onto the corresponding pillar.

24. The origami-based contact member of claim 23, wherein the sliding range between the collars and pillars is preset to confining the depression range of the origami-based contact member.

25. The origami-based contact member of claim 19, wherein each cable is independent from each other, and has a free end extending out of the proximal panel to be pulled/released independently.

26. A haptic stepping device for providing active mechanical haptics, comprising:
the origami-based contact members of claim 25, wherein the user's body site is foot; and
an actuation mechanism including the cables and a control portion,
wherein the control portion is configured to: communicate with a VR/AR engine, so as to receive a stiffness tuning command indicating the current stiffness of a virtual object upon track the user's active stepping operation on the virtual object in a VR/AR scene; controlling the actuation mechanism in response to the stiffness tuning command, so as to pull/release the cables synchronously to tune the stiffness to be perceived by the user's foot.

27. The haptic stepping device of claim 26, wherein:
the control portion comprises a micro-controller, a distance sensing module and a wireless communication interface,
the distance sensing module is configured to convert the sensed distance change caused by the user's active stepping on the top plate by the user's foot, into voltage change; and
the micro-controller is coupled to the distance sensing module and forwarded the voltage change to the VR/AR engine via the wireless communication interface, so that the VR/AR engine then transforms the voltage change to deformation of the virtual object and alters the corresponding VR/AR scene to be seen by the user via a VR/AR device.

28. The haptic stepping device of claim 27, wherein:
the control portion further comprises a motor drive module, the actuation mechanism comprises a motor and a transmission system including the cables,
the micro-controller is further configured to: if the deformation of the virtual object brings about its change of current stiffness, receive a stiffness tuning command indicating the varied stiffness of a virtual object from the VR/AR engine; transmitting a driving command to the motor drive module in response to the stiffness tuning command;
the motor drive module is further configured to actuate the motor to transmit pulling/releasing by the transmission system to the cables to tune the stiffness to be perceived by the user's foot.

29. The haptic stepping device of claim 28, wherein the motor comprises a driving shaft, the transmission system further comprises a worm screw mounted and fixed to the driving shaft of the motor, and rollers provided corresponding to the rows,
the rollers each have axes vertical to that of the driving shaft and the worm screw and are formed with threads to be screwed with the worm screw together,
each cable is winded around the corresponding rollers,
wherein, the worm screw rotates as the driving shaft rotates, and delivers the rotation to the rollers, which turn the cables to pull/release the free ends of the cables synchronously.

30. An origami-based contact member used for active mechanical haptics, comprising:
a top plate, a bottom plate, and at least one piece of a curved origami-based metamaterial interposed therebetween,
wherein the curved origami-based metamaterial comprises a panel having a single curved crease extending in its longitudinal direction, which divides the panel into two facets at its two opposite sides, and the panel is configured to be folded along the single curved crease to form a folding angle between the two facets
wherein a variable stiffness of the curved origami-based metamaterial is achieved by twisting the panel, or, pulling/releasing the panel by a connecting member passing through the panel to adjust the folding angle, and
wherein the variable stiffness covers positive stiffness to negative stiffness.

* * * * *